United States Patent [19]
Stach

[11] Patent Number: 5,641,208
[45] Date of Patent: Jun. 24, 1997

[54] WHEEL FOR A MOTOR VEHICLE HAVING HOLLOW SPOKES AND A CENTRALLY ARRANGED VALVE

[75] Inventor: Jens Stach, Eberdingen, Germany

[73] Assignee: Dr. Ing. h.c.F. Porsche AG, Germany

[21] Appl. No.: 519,807

[22] Filed: Aug. 25, 1995

[30] Foreign Application Priority Data

Aug. 27, 1994 [DE] Germany .................... 44 30 488.9

[51] Int. Cl.⁶ .................................................. B60B 1/00
[52] U.S. Cl. .................................... 301/64.1; 301/104
[58] Field of Search ........................... 301/5.24, 65, 104; 152/415, 418, 427

[56] References Cited

U.S. PATENT DOCUMENTS

| | | | |
|---|---|---|---|
| 1,173,491 | 2/1916 | Downing | 152/60 |
| 3,113,604 | 12/1963 | Connor | 152/418 X |
| 4,169,497 | 10/1979 | Tsuruta | 152/418 |
| 5,313,996 | 5/1994 | Bragg. | |
| 5,538,329 | 7/1996 | Stach | 301/65 |

FOREIGN PATENT DOCUMENTS

| | | |
|---|---|---|
| 0228670A2 | 7/1987 | Germany. |
| 8905057 U | 8/1989 | Germany. |
| 4103644A1 | 4/1992 | Germany. |
| 4138558C2 | 5/1993 | Germany. |
| 4430 488.9 | 5/1995 | Germany. |

Primary Examiner—Russell D. Stormer
Attorney, Agent, or Firm—Evenson, McKeown, Edwards & Lenahan P.L.L.C.

[57] ABSTRACT

A wheel for a motor vehicle has a wheel spider having hollow spokes communicating a first annular duct arranged concentrically with respect to the wheel axle with a second annular duct which is formed by the wheel spider and the rim. In the area of the first annular duct, a tire inflation valve is arranged. The hollow spokes are constructed with at least one air opening in the second annular duct, for conducting air into a tire interior.

20 Claims, 2 Drawing Sheets

WHEEL FOR A MOTOR VEHICLE HAVING HOLLOW SPOKES AND A CENTRALLY ARRANGED VALVE

BACKGROUND AND SUMMARY OF THE INVENTION

The present invention relates to a wheel for a motor vehicle, and more particularly, to a wheel having a wheel spider with hollow spokes and with a tire inflation valve near the wheel hub.

From German Patent Document DE-41 03 644 A1, a vehicle wheel is known which has a tire inflation valve close to the wheel axle. An air connection from the valve to the tire interior takes place by way of a bored duct in one of the wheel spokes.

An object of the present invention is to arrange a tire inflation valve or a tire inflation sensor corresponding to the respective requirements in a vehicle wheel comprising hollow spokes.

This and other objects have been achieved according to the present invention by providing a wheel having a wheel spider connected to a rim, where the wheel spider comprises multiple hollow spokes communicating a first annular duct inside the wheel spider with a second annular duct proximate the rim. A tire inflation valve is arranged proximate the first annular duct, and the second annular duct has at least one air opening into an interior region of a tire mounted upon the rim.

An advantage of the present invention is that, as a result of the hollow spokes as well as the first and second annular ducts, the tire inflation valve can optionally be arranged close to the wheel center or in another area of the hollow spokes or annular ducts. In addition to reducing the balance error of the wheel, this creates an easily accessible position of the valve.

In particular, in the case of a first embodiment, the valve is arranged on the wheel mounting bolt hole circle of the wheel mounting bolt holes of the wheel, and, in the case of a second embodiment, the valve is arranged in a centric passage opening of the wheel.

In the first embodiment, the valve is held in a bore between two screw bores of the wheel spider (i.e., the wheel hub and spokes). The bore receiving the valve may be covered with a cap or the like so that the valve is invisible from the outside and is protected from outside influences.

In the second embodiment, the valve is arranged in the centric passage bore of the wheel in a wall bounding the hollow spokes. This embedded position results in a closer local arrangement to the wheel axle and therefore in an advantageous effect with respect to a wheel balance error and, at the same time, the valve is arranged to be protected from outside influences. In addition, the passage opening of the wheel can be secured by means of a centric cap.

These and other objects, features and advantages of the present invention will become more readily apparent from the following detailed description when taken in conjunction with the accompanying drawings.

DETAILED DESCRIPTION OF THE DRAWINGS

Figure 1:
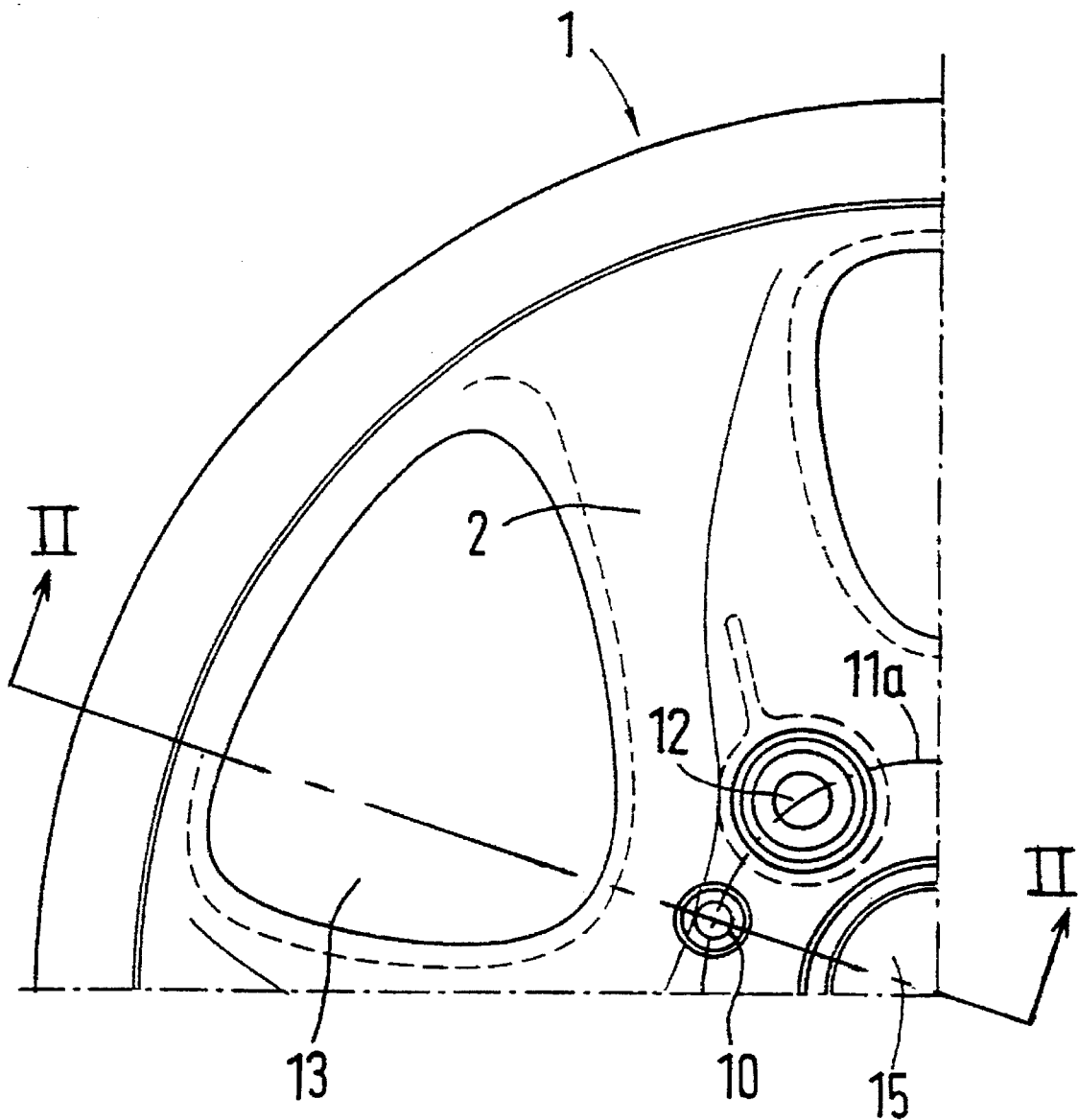
FIG. 1 is a partial side view of a vehicle wheel constructed according to a preferred embodiment of the invention.

The wheel 1 comprises a wheel spider 2 with hollow spokes 3 and a ring-shaped rim 4 which is formed integrally with the wheel spider or is connected with the wheel spider. Between the wheel spider 2 and the rim 4, a first annular duct 6 is constructed in the area 5 of the rim flange, the air spaces H of the hollow spokes 3, which face the flange, each leading into the first annular duct 6. Furthermore, another annular duct 7 is provided concentrically to the wheel axle 8, the air spaces H of the hollow spokes 3, which face the wheel axle 8, leading into the additional annular duct 7. In annular duct 6, one or several air openings 9 are provided in the direction of the tire interior so that, by way of the connection of the air spaces H of the spokes 3 with the hollow spaces of the two annular ducts 6 and 7, a continuous conducting of air exists from the annular duct 7 to the tire interior 20.

In the area of the second annular duct 7, a tire inflation valve 10 is arranged which in a simple manner permits the tire to be filled with air from the direction of the wheel center.

Figure 2:
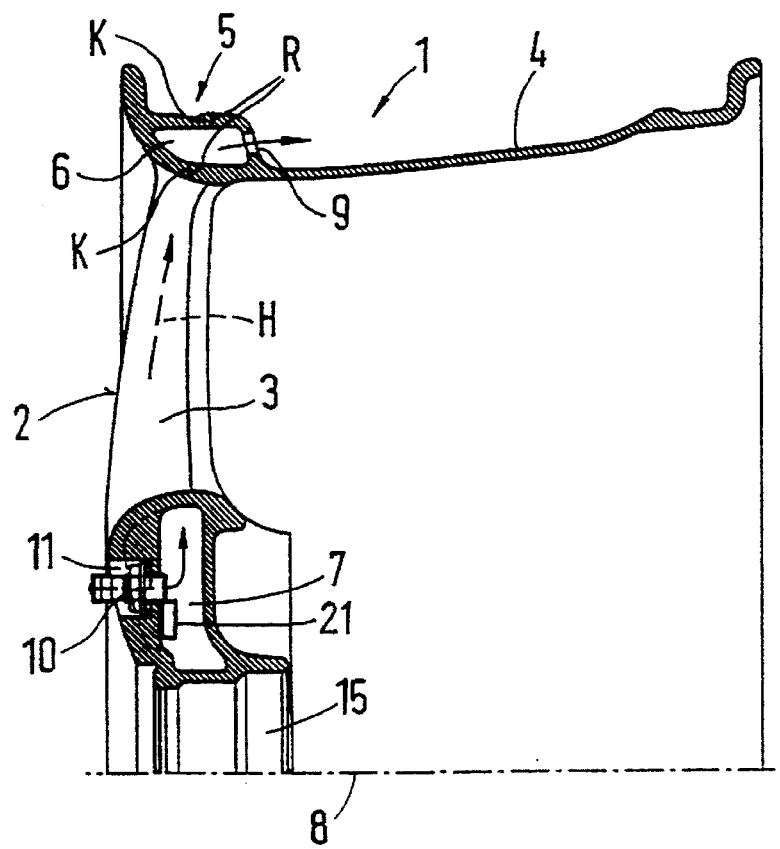
FIG. 2 is a sectional view of the wheel taken along Line II—II of FIG. 1, with a valve arranged on the exterior side of the wheel.

In a first embodiment according to FIG. 2, the valve 10 is arranged on the exterior side of the wheel 1 in the wheel spider 2, for example, in a bore 11. As illustrated in detail in FIG. 1, the valve 10 is arranged on a hole circle 11a for the wheel mounting bolt holes 12 of the wheel 1. In particular, the valve is provided on the wheel mounting bolt hole circle and centered between two wheel mounting bolt holes. However, the valve 10 may also be located at a different point of the wheel spider 2, such as proximate the air opening 13, according to other contemplated embodiments of the invention.

The valve 10 extends preferably in parallel to the axis of the wheel axle 8 and may be covered in the bore 11 by means of a cap or the like.

Figure 3:
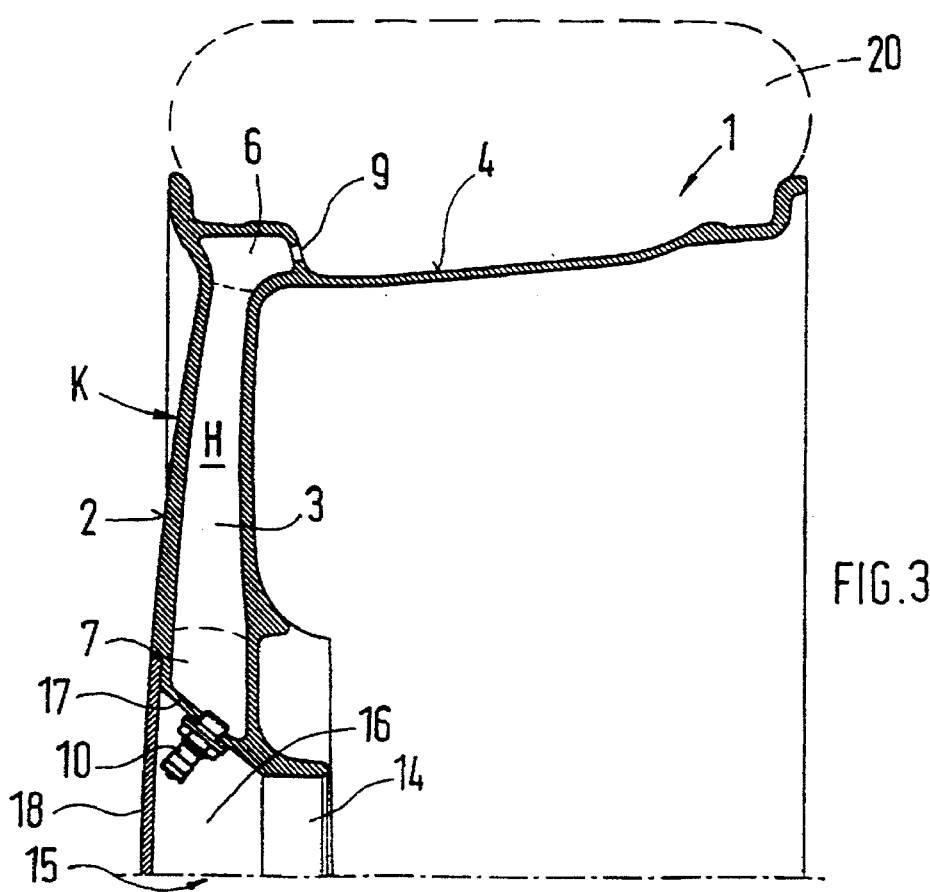
FIG. 3 is a view similar to FIG. 2, showing a second preferred embodiment of the invention, with the valve in a centric passage bore of the wheel.

According to the embodiment shown in FIG. 3, the passage opening 15 of the wheel has a cylindrical first section 14 and an adjoining second conical section 16 which points in the direction of the exterior side of the wheel. This section 16 is partially bounded by end face walls 17 of the hollow spokes 3, the valve 10 being mounted in one face wall 17. This valve 10 projects at an acute angle with respect to the wheel axle 8 into the passage opening 15 and does not project beyond the outer contour K of the wheel spider 2. The opening may be closed off by a selectively removable cap 18 so that the valve 10 is arranged to be secure, protected and difficult to access for unauthorized persons.

In addition to providing the possibility of arranging the valve close to the wheel axle, the construction of the wheel 1 with hollow spokes 3 and annular ducts 6, 7 also offers the advantage that a combined arrangement of the valve 10 and a tire inflation sensor 21 may be provided. Embodiments are also contemplated with the tire inflation sensor arranged separately from the valve close to the annular duct. Embodiments are also contemplated with the tire inflation sensor arranged in a hollow spoke or the outer annular duct.

The wheel 1 preferably has a cast wheel spider 2 which is connected with the rim 4 by way of a friction weld R in the area of the outer annular duct 6. This type of connection permits in a simple manner a largely free design of the mutually connected air spaces from the inner annular duct 7 by way of the hollow spokes 3 to the outer annular duct 6 and from here, by way of at least one opening 9, into the tire interior 20. By means of such a construction of the wheel, the arrangement of the valve 10 or the arrangement of a separate inflation sensor or of an inflation sensor combined with the valve may be freely selected while taking into account the achieved technical and aesthetic advantages.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A vehicle wheel having a wheel spider connected to a rim, said wheel spider comprising a plurality of hollow spokes communicating a first annular duct inside the wheel spider with a second annular duct proximate the rim, wherein a tire inflation valve is arranged proximate the first annular duct and in communication with the first annular duct, and the second annular duct comprises at least one air opening into an interior region of a tire mounted upon the rim.

2. A wheel according to claim 1, further comprising a plurality of wheel mounting bolt holes, wherein the valve is arranged adjacent to one of the wheel mounting bolt holes.

3. A wheel according to claim 1, further comprising a plurality of wheel mounting bolt holes, wherein the valve is arranged on a circle defined by said plurality of wheel mounting bolt holes.

4. A wheel according to claim 3, wherein the valve is arranged immediately adjacent to one of the wheel mounting bolt holes and is aligned parallel to an axle upon which the wheel is mounted.

5. A wheel according to claim 1, further comprising a plurality of wheel mounting bolt holes, wherein the valve is arranged immediately adjacent to one of the wheel mounting bolt holes and is aligned parallel to an axle upon which the wheel is mounted.

6. A wheel according to claim 1, wherein the valve is arranged in a wall of one of said hollow spokes proximate a central wheel hub opening, said wall being configured as a conical section around said hub opening, and adjoining a cylindrical section around said hub opening.

7. A wheel according to claim 6, wherein the conical section is closed off with respect to an exterior side of the wheel by a cap.

8. A wheel according to claim 6, wherein the valve is arranged in a wall of one of said hollow spokes at an acute angle with respect to an axle upon which the wheel is mounted.

9. A wheel according to claim 6, wherein the valve is connected with a tire inflation sensor.

10. A wheel according to claim 1, wherein the valve is arranged in a wall of one of said hollow spokes at an acute angle with respect to an axle upon which the wheel is mounted.

11. A wheel according to claim 1, wherein the valve is connected with a tire inflation sensor.

12. A wheel according to claim 1, wherein the wheel spider and the rim comprise respective ring shaped friction welding surfaces, and wherein the wheel spider is connected to the rim by way of friction welding along the respective ring shaped friction welding surfaces.

13. A vehicle wheel having a wheel spider connected to a rim, said wheel spider comprising a plurality of hollow spokes communicating a first annular duct inside the wheel spider with a second annular duct proximate the rim, wherein a tire inflation valve is arranged proximate the first annular duct in a wall of one of said hollow spokes at an acute angle with respect to an axle upon which the wheel is mounted, and the second annular duct comprises at least one air opening into an interior region of a tire mounted upon the rim.

14. A vehicle wheel having a wheel spider connected to a rim, said wheel spider comprising a plurality of hollow spokes communicating a first annular duct inside the wheel spider with a second annular duct proximate the rim, wherein a tire inflation valve is arranged proximate the first annular duct, the second annular duct comprises at least one air opening into an interior region of a tire mounted upon the rim, and the tire inflation valve is in communication with said interior region by way of said first annular duct, said hollow spokes, said second annular duct, and said at least one air opening.

15. A wheel according to claim 14, further comprising a plurality of wheel mounting bolt holes, wherein the valve is arranged adjacent to one of the wheel mounting bolt holes.

16. A wheel according to claim 14, further comprising a plurality of wheel mounting bolt holes, wherein the valve is arranged on a circle defined by said plurality of wheel mounting bolt holes.

17. A wheel according to claim 14, further comprising a plurality of wheel mounting bolt holes, wherein the valve is arranged immediately adjacent to one of the wheel mounting bolt holes and is aligned parallel to an axle upon which the wheel is mounted.

18. A wheel according to claim 14, wherein the valve is arranged in a wall of one of said hollow spokes proximate a central wheel hub opening, said wall being configured as a conical section around said hub opening, and adjoining a cylindrical section around said hub opening.

19. A wheel according to claim 18, wherein the conical section is closed off with respect to an exterior side of the wheel by a cap.

20. A wheel according to claim 14, wherein the valve is arranged in a wall of one of said hollow spokes at an acute angle with respect to an axle upon which the wheel is mounted.

* * * * *